April 27, 1954

L. W. RUSSUM 2,677,000

HYDROCARBON CONVERSION WITH ALUMINUM
CHLORIDE-HYDROCARBON
COMPLEX CATALYST

Filed Feb. 27, 1951

INVENTOR.
Leonard W. Russum
BY Donald E. Payne
ATTORNEY

Patented Apr. 27, 1954

2,677,000

UNITED STATES PATENT OFFICE 2,677,000

HYDROCARBON CONVERSION WITH ALUMINUM CHLORIDE - HYDROCARBON COMPLEX CATALYST

Leonard W. Russum, Whiting, Ind., assignor to Standard Oil Company, Chicago, Ill., a corporation of Indiana Application February 27, 1951, Serial No. 212,890

5 Claims. (Cl. 260—683.15)

1

This invention relates to an improved method and means for effecting hydrocarbon conversion with an aluminum chloride-hydrocarbon complex catalyst and it pertains more particularly to an improved process for the polymerization of normally gaseous olefins such as butylenes.

It has long been known that normally gaseous olefins can be converted to viscous liquid polymers by means of solid aluminum chloride as such or by means of liquid aluminum chloride double compounds or complexes. Effective use of an aluminum chloride hydrocarbon complex catalyst has been obtained by passing dispersed liquefied olefins upwardly through a cooled column thereof. An object of this invention is to provide a further improvement in the use of aluminum chloride-hydrocarbon complex in hydrocarbon conversion processes and particularly in processes for polymerizing normally gaseous olefins such as propylene, isobutylene, normal butenes, and mixtures thereof. A particular object of the invention is to increase the quantity and quality of polymers obtainable in a given polymerization reactor by means of liquid aluminum chloride-hydrocarbon complex catalyst. Other objects will become apparent as the detailed description of the invention proceeds.

Briefly, the invention employs a continuous liquid phase conversion system wherein liquid aluminum chloride-hydrocarbon complex catalyst is dispersed in a continuous liquid hydrocarbon reactant phase, the continuous reactant phase with suspended liquid catalyst is rapidly impelled against cooling surfaces to obtain a high heat transfer coefficient and thus maintain a substantially uniform temperature, the liquid catalyst is continuously separated from the hydrocarbon phase and the bulk of it is recycled and redispersed in the continuous liquid hydrocarbon reactant phase, only a minor amount of the separated complex being withdrawn and the recycled complex being continuously fortified by the addition of a slurry or suspension of aluminum chloride in finely divided form.

As applied to the polymerization of normal and isobutylenes in a petroleum refinery butane-butylene stream, a particular embodiment of the invention contemplates the introduction of said stream into a vertical reactor at a level adjacent but spaced from the bottom thereof, introducing liquid aluminum chloride-hydrocarbon complex catalyst at a level adjacent but spaced from the top of the reactor, stirring the hydrocarbon phase and suspended catalyst in the central portion of the reactor to impel it against peripheral cooling coils or tubes through which a refrigerant is circulated to maintain a temperature in the range of about 20° F. to about 80° F. and preferably about 25° F. to 50° F., maintaining sufficient pressure to insure liquid phase conditions, e. g. about 100 p. s. i. g., withdrawing settled complex from a quiescent zone at the bottom of the reactor and effluent product from the top thereof, discarding a minor part of the withdrawn complex and recycling a major part of the withdrawn complex for introduction into the upper part of the reactor at a rate which is at least about .25 times the rate of charging stock introduction and continuously fortifying recycled catalyst by incorporating therewith (either outside or inside of the reactor) the required amount of powdered aluminum chloride which in this case is usually about .1 to 2 pound per 100 pounds of olefin in the charging stock.

The general arrangement and operation of the entire system, of which the reactors form a part, may be substantially as described in connection with Fig. 2 of U. S. Patent No. 2,407,873 with respect to which the present invention constitutes a marked improvement. By means of the present invention the capacity of such system may be increased to a most remarkable extent, about three-fold or more. At the same time the product quality is remarkably improved; for example, the reactors in the prior systems produced approximately equal amounts of light and heavy polymers while the method and means of my invention results in production of about 90% heavy polymer and only about 10% light polymer. Heat transfer coefficient in the reactor is enormously improved which in turn not only decreases refrigerant costs but makes possible the attainment of a much more uniform temperature in the reactor than was heretofore possible. The catalyst is utilized more effectively and product quality is remarkably uniform.

The invention will be more clearly understood from the following detailed description of a specific example read in conjunction with the accompanying drawing which forms a part of this specification and in which.

While the invention is applicable to any liquid phase conversion process employing a liquid aluminum chloride complex catalyst wherein the catalyst is of different density than the liquid undergoing conversion and dispersable therein as a separate phase and in which temperature control is effected by use of heat exchange surfaces in the reactor, it is particularly applicable to the polymerization of normally gaseous olefins such as propylene, isobutylene, normal butenes and mixtures thereof. In this example, the charging stock is a petroleum refinery butane-butylene stream containing about 26 weight per cent isobutylene, about 37 weight per cent normal butylenes, and about 36 weight per cent butanes, such stocks usually containing a small amount of propane, propylene, pentanes and/or pentenes. Prior to the polymerization step the butane-butylene charge, which in this example may amount to about 900 to 950 barrels per stream day, is first caustic washed, dried, and cooled by refrigeration to a temperature of about 0° to 30° F. The cooled stream is then introduced into the conversion zone or reactor, the detailed structure and operation of which will now be set forth in greater detail.

Figure 1:
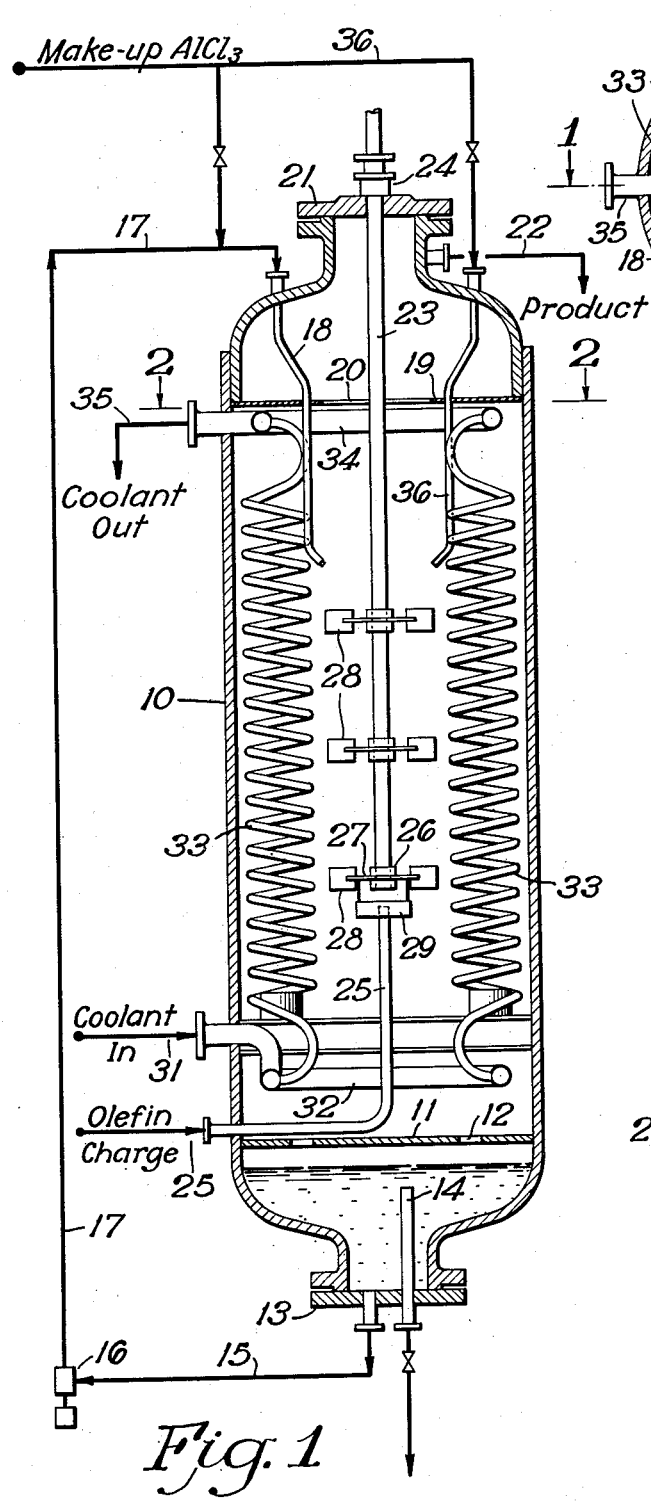
Fig. 1 is a vertical section of the reactor taken along the lines 1—1 of Fig. 2 and illustrating the recycle of liquid catalyst complex.
Figure 2:
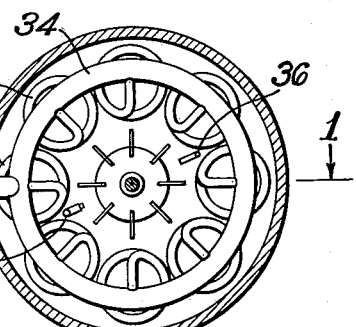
Fig. 2 is a horizontal section of the reactor taken along the lines 2—2 of Fig. 1.

Referring to Figs. 1 and 2, each reactor (in this example, 2 reactors are employed in parallel) consists of a cylindrical vessel 10 about 12½ feet high and about 4½ feet inside diameter. Just above the narrowed bottom portion of the reactor vessel, there is a baffle plate 11 provided with eight 4 inch holes 12. The base plate reactor closure 13 is provided with two outlet conduits. Conduit 14 preferably extends upwardly into the quiescent zone between base plate 13 and baffle 11 and it serves to discharge complex from the system. Conduit 15 serves as an inlet for pump 16 which recycles liquid catalyst complex through line 17 and pipe 18 to a point in the reactor which is adjacent but spaced from the top thereof. In this particular example, catalyst complex is thus recycled at the rate of 900 gallons per hour while only about 3 to 30 gallons per hour of complex is discharged through conduit 14.

At the upper part of the reactor, a baffle 19 is provided which preferably has a central opening 20 to facilitate insertion of the stirrer or impeller. The quiescent zone between baffle 19 and top closure plate 21 provides a settling space for returning any entrained catalyst droplets to the reactor so that substantially catalyst-free hydrocarbon product effluent may be withdrawn through product discharge line 22. The product stream thus withdrawn from each reactor is passed through one or more settling zones (not shown) for removing any residual entrained catalyst complex and such complex is combined with that withdrawn through conduit 14. The product effluent is then caustic washed to remove traces of aluminum chloride, filtered through a limestone bed to remove entrained aluminum compounds, flashed to remove unreacted hydrocarbons, and fractionated into light and heavy polymer. Heavy polymer as employed herein means polymer having a viscosity of at least about 500 seconds (Saybolt Universal) at 210° F., the S. S. U. viscosity of heavy polymer in this case being about 900 to 1000.

Figure 3:
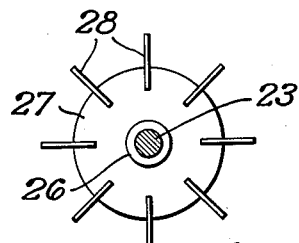
Fig. 3 is a top view of an impeller assembly.
Figure 4:
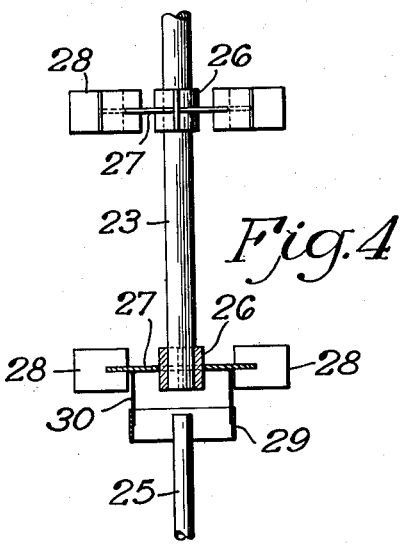
Fig. 4 is a side view of the impeller assembly.

A shaft 23 extends through top closure plate 21 through packing gland 24 and is driven by a suitable motor (not shown) at a rate of about 25 to 250 R. P. M., preferably about 125 R. P. M. In this particular example the shaft terminates about 4 feet above baffle 11 and immediately above the discharge end of the upwardly extending charging stock inlet line 25. At the base of shaft 23 is fixed a collar 26 carrying a disc 27 to which vertical impeller blades 28 are secured in radial position, each impeller blade being about 5 inches long and 4 inches wide and the impeller plates being placed at about 45° intervals, as shown in Figs. 3 and 4, the tip to tip distance of blades on a diameter being about 20 inches. A similar impeller blade assembly is mounted about 2 feet above the lowermost impeller blade assembly and a third impeller blade assembly is mounted about 4 feet above the bottom of the shaft, the third impeller blade assembly being just below the discharge end of catalyst inlet line 18. A stabilizer ring 29 is secured to the lowermost disc 27 by bracket 30, the function of this stabilizer ring being to prevent lateral vibration or "whipping" of the lower end of the shaft 22.

Refrigerant is supplied through line 31 to lower header 32 from which it passes through a plurality of annular spaced spiral coils 33 to upper header 34 which in turn is connected to refrigerant outlet line 35. In this particular example, the refrigerant is liquid propane introduced at the rate of about 30 gallons per minute at a temperature of approximately 0° F. and under a pressure of approximately 25 p. s. i. g., the coils providing about 480 to 500 square feet of heat exchange surface. The vaporized propane is compressed and condensed in a system similar to that illustrated in Fig. 2 of U. S. 2,407,873 and evaporation of another portion of the condensed refrigerant in a heat exchanger provides for cooling the charging stock to the desired inlet temperature.

In operation, the cooled charging stock is introduced into the reactor through line 25 at the rate of about 450 barrels per day or approximately 790 gallons per hour and the introduced hydrocarbon forms a continuous phase in that portion of the reactor above baffle 11. Catalyst is introduced through line 18 at the rate of about 515 barrels per day or 900 gallons per hour. The catalyst, which will be hereinafter described in more detail, has a specific gravity of approximately 1.4 and is thus so much heavier than the hydrocarbon that it tends to settle rapidly through the continuous hydrocarbon phase in the reactor so that at any instant the bulk of the reactor above the upper end of the inlet line 25 is filled chiefly with a continuous phase of liquid hydrocarbon containing dispersed liquid catalyst. Intimate mixing of the dispersed catalyst in the continuous hydrocarbon phase is obtained by the mixer or impeller system. A most important function of the impeller system, however, is to maintain a high heat transfer coefficient of at least about 25 (B. t. u. per hour—square foot—°F.) to obtain maximum effectiveness and efficiency of the refrigeration system and to insure a substantially uniform temperature throughout the reactor. Such a high heat transfer coefficient can be obtained at the mixer speed of about 125 R. P. M. only because the continuous phase in the system is a low-viscosity hydrocarbon mixture rather than a high viscosity liquid catalyst.

The aluminum chloride hydrocarbon complex catalyst is substantially the same as described in U. S. 2,407,873 and it may be prepared by reaction of aluminum chloride with a saturated light hydrocarbon, preferably in the presence of hydrogen chloride, to give a complex having a hydrocarbon content of the order of about 20% to 60% by weight, the used catalyst withdrawn from the system usually having a hydrocarbon content of about 60 weight per cent or higher. The complex can be prepared from the butane-butylene charge itself or it may be prepared by treating pentane or light naphtha or a light polymer fraction. Since the complex tends to build up in its hydrocarbon content during use, it is necessary to continuously or intermittently withdraw a portion of the complex and to fortify the remaining complex with make-up aluminum chloride. This make-up aluminum chloride may be added directly to the recycled complex stream, it may be slurried in a carrier liquid such as light polymer and thus introduced into the recycled complex stream for fortifying the catalyst therein or it may be introduced as a slurry into the upper part of the reactor through a separate inlet line 36 at substantially the same level at which complex is introduced. In any case, the aluminum chloride should be in powder or finely divided form so that it may be readily slurried, pumped and combined with complex so that even when it is introduced as a slurry directly into the reactor, it will immediately be converted or incorporated into liquid complex. Whether introduced into recycled catalyst or into the reaction zone itself as a slurry in light polymer, it is preferred to prepare the slurry at sufficiently low temperature to avoid substantial complex formation with the polymer itself since it is desirable that the aluminum chloride fortify complex without consuming undue amounts of polymer or charging stock. In this particular example, about 1100 pounds per day of powdered aluminum chloride may be employed, approximately 23 pounds per hour being incorporated in the catalyst in each reactor either by addition to the recycled complex or by separate introduction in about 30 or 40 gallons per hour of a slurry in light polymer product.

The remarkable effectiveness of the above described process and apparatus is shown by the fact that with two reactors operating in parallel in the manner hereinabove described and assuming an on-stream time of only about 85 to 90%, about 2,400,000 gallons per year of heavy polymer can be produced as compared with the 800,000 gallon annual production in the three reactor system described in U. S. 2,407,873, even though the reactors are of the same size.

While a specific example of the invention has been disclosed in considerable detail, it should be understood that alternative structures and operating procedures will be apparent from the above description to those skilled in the art. Other types of mixing, circulating or stirring means may be employed instead of the specific impeller structure hereinabove described provided that the mixing or circulating means serves the important functions of (1) intimately mixing liquid catalyst complex with a continuous hydrocarbon phase, and (2) obtaining efficient heat transfer and uniform temperature. Separate settling zones may be employed outside of the reactor itself for separating complex from hydrocarbons and hydrocarbons from complex, respectively. The rate of catalyst recirculation may be greater or less than that hereinabove described, but this rate should be sufficient to provide the necessary amount of catalyst for effecting the reaction and to insure that the hydrocarbon will be in the continuous phase in the mixing zone. The temperature should be at least about 20° and preferably higher than 25° F. because at low temperatures the catalyst complex tends to solidify or become too viscous to be readily handled. For maximum heavy polymer production, the temperature should be below about 80° F. and preferably not higher than about 50° F. With all other conditions constant, somewhat higher conversion (based on olefins charged) may be effected by introducing charging stock at an even lower rate than 450 barrels per stream day; conversely a higher charging stock inlet rate results in somewhat lower olefin conversion (based on olefins charged).

It should be pointed out that the lower baffle plate 11 serves an important function in preventing any pick up of settled catalyst by the stirrer, the liquid complex interface usually being below baffle plate 11 but above the upper part of conduit 14. It has been found that if complex is not withdrawn from the reactor at a sufficiently rapid rate to prevent settled complex from being picked up by the stirring mechanism within the reactor, erratic reaction occurs and product uniformity is thus not attainable. An important feature of the invention is to insure the maintenance of the reactant hydrocarbon liquid in continuous phase by withdrawing complex (either with reactant product or from a low level quiescent zone in the reactor) at such a rate as to prevent an accumulation of complex in the reactor which could be picked up by the stirrer or impeller.

While the above description has been directed primarily to a specific example of the use of the invention for polymerizing butylenes from a butane-butylene stream it should be understood that the invention is equally applicable to the polymerization of other olefins or olefin mixtures. Although other processes employing liquid aluminum chloride complex catalysts differ in many respects from butylene polymerization and cannot be considered equivalent thereto, it should be understood that certain fundamental principles of the invention are applicable to such non-equivalent processes, examples of which are alkylation, isomerization, reforming, etc. Features of the invention are particularly applicable to processes wherein a liquid charging stock undergoing treatment is of different density than the liquid aluminum chloride complex catalyst and wherein a high heat transfer coefficient is attainable by impelling a continuous phase of liquid charging stock of relatively low viscosity against said heat exchange surfaces while continuously recycling large amounts of the liquid complex catalyst, the liquid undergoing treatment being in the continuous phase in the mixing or impelling zone. Other complex catalysts such as $AlBr_3$-hydrocarbon complexes and aluminum halide complexed with other organic materials may be used instead of the specific aluminum chloride-hydrocarbon complex herein described.

I claim:

1. The method of effecting hydrocarbon conversion with a liquid aluminum halide complex catalyst in a conversion zone containing heat exchange surfaces, which method comprises introducing a hydrocarbon charging stock in liquid phase into said zone at a low level therein which is above a lower settling zone, the conversion zone communicating directly with the settling zone, supplying catalyst for effecting catalytic conversion by introducing liquid aluminum halide complex catalyst into said conversion zone at a high level which is below an upper settling zone, said upper settling zone also communicating directly with the conversion zone, maintaining a continuous liquid hydrocarbon phase containing dispersed particles of catalyst complex throughout the conversion zone by withdrawing settled catalyst complex from the bottom of said lower settling zone to prevent an interface level of said settled complex from reaching the level of charging stock inlet, impelling said continuous hydrocarbon phase containing dispersed liquid particles of catalyst complex against said heat exchange surfaces in the conversion zone between the catalyst and charging stock inlets to obtain intimate mixing and a high heat transfer coefficient, discarding a minor amount of catalyst complex from the lower settling zone, recycling the major amount of catalyst complex withdrawn from the lower settling zone for introduction at said high level in the conversion zone, and adding make-up aluminum halide to the system to maintain the catalyst complex in active state and to compensate for catalyst complex discarded from the system.

2. The method of effecting hydrocarbon conversion with a liquid aluminum chloride-hydrocarbon complex catalyst in a conversion zone containing heat exchange surfaces, which method comprises introducing a hydrocarbon charging stock in liquid phase at a low level in a conversion zone which directly communicates at its upper end with an upper settling zone and which directly communicates at its lower end with a lower settling zone, introducing aluminum chloride-hydrocarbon complex catalyst and make-up aluminum chloride into said conversion zone at a high level which is below said upper settling zone, maintaining a continuous liquid hydrocarbon phase containing dispersed particles of catalyst complex throughout the conversion zone by withdrawing settled complex from the lower settling zone to prevent a settled complex interface from reaching the level of the charging stock inlet, impelling the continuous liquid hydrocarbon phase containing dispersed particles of catalyst complex against said heat exchange surfaces in at least that portion of the conversion zone between the catalyst and charging stock inlets to obtain intimate mixing and to prevent a build-up of complex on said heat exchange surfaces, discarding a minor amount of withdrawn catalyst complex and recycling the major amount of withdrawn catalyst complex for introduction at said high level in said conversion zone, settling catalyst from hydrocarbon liquid which is passed from the conversion zone into the upper settling zone to obtain a substantially catalyst-free reaction product, and withdrawing the reaction product for subsequent neutralization and fractionation.

3. The method of claim 2 wherein the make-up aluminum chloride is added to the system by incorporating it in at least a part of the recycled catalyst complex.

4. The method of claim 2 wherein the charging stock consists of a normally gaseous hydrocarbon stream containing polymerizable olefins, the temperature of the conversion zone is maintained in the range of about 20° F. to about 80° F. by heat transfer to said heat exchange surfaces and wherein a slurry of make-up aluminum chloride powder is introduced to the upper part of the reaction zone at approximately the level of the recycled catalyst complex inlet and at a rate which is greater than .1 per cent, but less than 2 per cent by weight, based on polymerizable olefins introduced into the reaction zone, the introduced aluminum chloride being of particle size smaller than 20 mesh.

5. The method of polymerizing butylenes contained in a charging stock consisting essentially butanes, isobutylene and normal butylenes, which method comprises introducing said charging stock in liquid phase at a low level into a conversion zone which directly communicates at its base with a lower settling zone and which directly communicates at its top with an upper settling zone, introducing aluminum chloride-hydrocarbon complex catalyst and make-up aluminum chloride into said conversion zone at a high level which is below the upper settling zone at a rate which is at least about .25 times the rate at which the charging stock stream is introduced thereto, maintaining the temperature in the conversion zone within the range of about 20° to 50° F. by circulating a refrigerant through peripherally arranged heat exchangers, maintaining a continuous hydrocarbon phase in the conversion zone by withdrawing catalyst complex from the lower settling zone to prevent a complex interface from reaching the level of charging stock inlet, impelling the hydrocarbon phase containing dispersed liquid catalyst complex particles against said peripherally arranged heat exchangers to obtain intimate mixing of the liquid hydrocarbon phase with suspended catalyst complex particles and also to obtain high heat transfer and uniform temperature, withdrawing reaction product diluted with butane from the upper settling zone and removing residual catalyst therefrom, recycling a major portion of the catalyst complex removed from the lower settling zone for reintroduction at said high level in said conversion zone, discarding a minor amount of catalyst complex from the system and adding aluminum chloride to the system in an amount in the range of from about .1 to 2 percent by weight to keep the catalyst active and to compensate for the aluminum chloride content of catalyst complex discarded from the system.

References Cited in the file of this patent
UNITED STATES PATENTS

| Number | Name | Date |
| --- | --- | --- |
| 679,575 | Reese | July 30, 1901 |
| 2,315,080 | Reid | Mar. 30, 1943 |
| 2,389,240 | Reid | Nov. 20, 1945 |
| 2,397,945 | Burney et al. | Apr. 9, 1946 |
| 2,460,987 | Kanhofer | Feb. 8, 1949 |
| 2,577,856 | Nelson | Dec. 11, 1951 |